MAGNETIC AMPLIFIER

Filed April 21, 1953

INVENTOR.
BERNARD LEE
BY Clement J Paznokas
ATTORNEY

United States Patent Office 2,780,771

Patented Feb. 5, 1957

2,780,771

MAGNETIC AMPLIFIER

Bernard Lee, University City, Mo., assignor to Vickers Incorporated, Detroit, Mich., a corporation of Michigan Application April 21, 1953, Serial No. 350,147

11 Claims. (Cl. 323—89)

This invention relates to power transmission and more particularly to saturable reactor circuits.

It is known that the saturation of and, consequently, the output of reactors in self-saturating reactor circuits may be controlled by applying to the reactor alternating current signals or control currents of the same frequency as the supply voltage, for example, by flowing the alternating current signal through a control winding on the reactor. A typical example falling within this classification of magnetic amplifier is the self-saturating reactor circuit wherein the reactance winding of the reactor is connected in series with a rectifier between the alternating voltage power supply input and the output circuit of the amplifier, thus allowing only intermittent pulses of unidirectional current to flow in the reactance winding and producing substantially unidirectional M. M. F. resulting in what is known as self-saturation.

The control of such an amplifier with alternating current signals of the same frequency as the supply voltage results in an undesirable condition when the amplifier output is being driven downward by a properly phased control signal. As the alternating signal current is increased the output of the amplifier decreases until cutoff or minimum output is reached, however, immediately after minimum output is reached and upon continued increase in the control signal, the output or load current begins to rise, resulting in an undesirable negative slope in the control characteristic after cutoff has been reached. This condition, common to alternating current controlled self-saturating reactor circuits, is sometimes referred to as the "rising tail of the control characteristic." The term "negative slope" is relative and is applicable when the slope of the normal operating range (high gain portion) from cutoff to maximum output is considered positive. It will be appreciated that when the slope of the normal operating portion of the control characteristic is considered negative, then the rising tail will have a positive slope. Considering cutoff as a divider, the normal operating range is on one side, while the region beyond cutoff is on the opposite side.

The undesirable rising negative slope beyond cutoff of the A. C. controlled self-saturating reactor is explained as follows: As the properly phased alternating signal is increased from zero, the output of the amplifier approaches and reaches cutoff or minimum output. At zero signal all the magnetizing current is furnished by the A. C. supply source. However, as the A. C. signal is applied and increased, more of the magnetizing current will be furnished by the signal current source. If zero output could be achieved as the amplifier minimum the signal source would supply the total magnetizing current at minimum output. When the signal in the same phase is further increased after minimum output is reached, the voltage induced thereby in the reactance winding tends to force current, derived from the control signal, through the load circuit. Since the arrangement of the reactance winding and its series rectifier is such that current therethrough cooperates to generate a pulsed unidirectional flux, the reactor will tend to saturate allowing more and more current to flow in the load circuit. The resulting control characteristic presents a rising negative slope upon increase of properly phased A. C. control voltage immediately after cutoff or minimum output of the amplifier has been reached, i. e., the amplifier output increases upon continued increase of A. C. control current in the region beyond cutoff almost immediately after minimum output has been reached. The present invention eliminates, reduces or delays the rising output upon continued increase of A. C. control current after minimum output has been reached. The present invention contemplates a magnetic amplifier controlled by alternating current and in which the output of the amplifier is substantially maintained at a chosen minimum output through an extended range of increasing alternating control current beyond cutoff.

It is therefore an object of the present invention to provide a magnetic amplifier with means for reducing the slope beyond cutoff of a magnetic amplifier controlled with an alternating current signal.

Another object of the invention is to provide a new and improved saturable reactor circuit employing alternating current signal control and having a control characteristic with a reduced slope beyond cutoff or minimum output.

Another object of the invention is to provide a saturable reactor circuit employing alternating current for controlling saturation thereof, and in which the output beyond the normal minimum output does not increase through an extended range beyond cutoff.

A further object of the invention is to provide an alternating current controlled, self-saturating reactor circuit having an improved control characteristic.

Further objects and advantages of the present invention will be apparent from the following description, reference being had to the accompanying drawing wherein a preferred form of the present invention is clearly shown.

Figure 2:
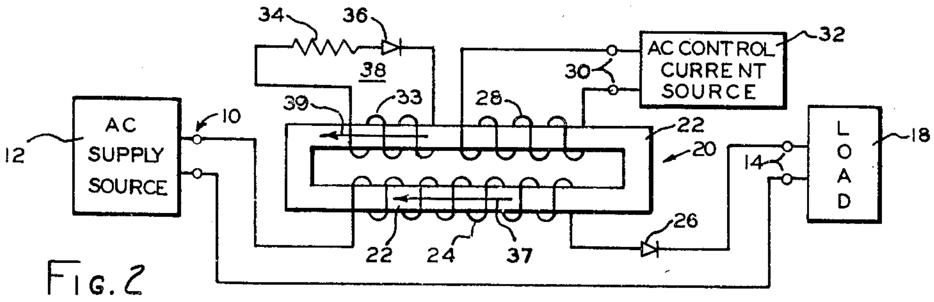
Fig. 2 is a diagram illustrating the invention as applied to a half-wave self-saturating magnetic amplifier.

The amplifier illustrated in Fig. 2 is provided with power input circuit 10 connected to a source of alternating supply current 12, output circuit terminals 14 connected to a load 18, and a self-saturating reactor circuit connected between the power input circuit and the output circuit for controlling energy transfer from the input to the output circuit and the load attached thereto.

Included in the self-saturation circuit is a saturable reactor 20 with a magnetizable core 22 provided with a reactance winding 24 connected in series with a rectifier 26 between the power input and the output circuits. It should be parenthetically noted that the reactance winding of a reactor is also variously known as the load winding, output winding and anode winding. With the components and arrangement thus described, the winding 24 will be subjected to cyclic unidirectional current pulses in the conducting direction of the rectifier 26 when the circuit is energized by alternating current from the supply source 12, thus generating a pulsed unidirectional M. M. F. tending to saturate the core 22 and reduce the impedance of the winding 24. The direction or sense of the M. M. F. resulting from current flow through the reactance winding and rectifier 26 is known as the saturating direction, and M. M. F.'s in that direction are known as saturating M. M. F.'s. M. M F.'s in the opposite direction are known as desaturating M. M. F.'s.

The saturation level of the core 22 and, consequently, the output of the reactor may be controlled with alternating current supplied to any winding on the core, for example, the control winding 28 shown as a part of a signal input circuit including terminals 30 which are connected to a source of alternating control or signal current 32 whose phase and amplitude may be adjusted for the desired control.

Figure 1:
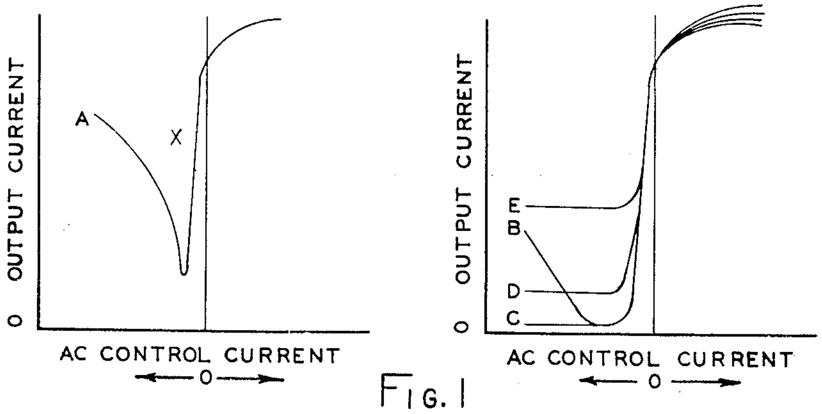
Fig. 1 is a chart with curves representing the control characteristics of A. C. controlled self-saturating magnetic amplifiers with and without the benefit of the present invention.

When the alternating signal current applied to the control winding 28 is properly phased to drive the output of the amplifier downward in response to increased signal current, for example when the applied signal ampere turns lag the power supply voltage by 90° neglecting losses, the circuit thus far described produces the type of control characteristic represented by curve A in Fig. 1, and operates as follows: As the signal current is increased the output of the amplifier will be driven toward minimum output. Until minimum output is reached, magnetizing current is derived primarily through the power input circuit 10 from the supply source 12. This portion of the control characteristic is the normal operating range and is indicated at X in Fig. 1. Since most of the magnetizing current within the range denoted by X is supplied from the supply source 12, the voltage drop across the winding 24 due to current supplied from the supply source 12 is greater than the voltage across the same winding induced by the signal current alone flowing in the control winding 28. When the minimum output is reached, the voltage induced in the winding 24 by the A. C. signal current in the control winding 28 will be approximately equal and opposite to the supply voltage drop across winding 24. As the signal current in the same phase is further increased the voltage across the winding 24 induced by signal currents in the control winding 28 will tend to exceed the supply voltage drop across the winding 24 and current forced by induced voltage derived from the signal source will flow through the output circuit and into the power supply. This current flow can be only in the conducting direction of the rectifier 26 and will tend to saturate the core 22 and thereby further increase the flow of current in the load circuit. This produces the undesirable rising negative slope in the region beyond cutoff of the control characteristic of the amplifier as illustrated in curve A of Fig. 1.

In accordance with the present invention the rising negative slope of the normal control characteristic of an A. C. controlled self-saturating magnetic amplifier is reduced, delayed, or substantially eliminated by forming a closed current path including at least a portion of a winding on the reactor and effective impedance, for example resistance, in series with a rectifier shunted across at least a portion of this winding, the rectifier being poled to allow current flow in the proper direction to produce the desired opposition or desaturating M. M. F.'s. The terminology "across the winding" as used herein is applicable whether the closed current path includes all of the winding or a portion of the winding. In the embodiment shown, a winding 33 is the winding employed to form the closed current path with an impedance 34, for example a resistor, and a rectifier 36 which are shunted across the winding 33, the closed current path being indicated generally at 38. The rectifier 36 is so poled that it will permit current flow through winding 33 in a direction to generate M. M. F.'s in opposite sense to M. M. F.'s produced by current in winding 24 in the conducting direction of rectifier 26.

For the general case, the windings and rectifiers are so related that M. M. F.'s produced in the reactor by current conduction through rectifier 26 will be oppositely sensed to M. M. F.'s produced by induced current circulating through the closed current path, including the resistor 34 and rectifier 36 and the winding across which they are shunted, in this case the winding 33. The signal current will induce voltages in the windings which will cause current to flow through winding 24 in the conducting direction of rectifier 26 on one-half cycle resulting in M. M. F.'s of one sense, and through the winding of the closed current path and its shunt rectifier 36 on the other half cycle resulting in M. M. F.'s of the opposite sense. Thus, when minimum has been reached, currents in the windings resulting from voltages induced by the signal currents will generate oppositely sensed M. M. F.'s in the reactor thereby substantially avoiding self-saturating tendencies and substantially preventing any rise in output through a substantial range beyond cutoff.

For the specific case used as illustration herein, it will be seen that current induced in the winding 24 by signal currents flowing in the winding 28 will on one-half cycle flow in the conducting direction of rectifier 26 resulting in M. M. F.'s in one sense (arrow 37), and on the other or opposite half cycle flow through the winding 33 in a direction resulting in M. M. F.'s in the opposite sense (arrow 39). Thus, the necessary flux changes are provided to allow the reactor to absorb most of the line voltage through an extended range beyond cutoff. As a result, once minimum output has been reached with properly phased alternating control current, any further increase in the control current within a substantial range will not cause a rising negative slope in the control characteristic. On the contrary, the characteristic will be maintained at substantially minimum output through an extended range beyond cutoff as indicated, for example, by curve C in Fig. 1.

The value of the resistance 34 should be such as to allow sufficient circulating current to flow in the closed current path 38 to set up the flux conditions at which sufficient line voltage can be absorbed by the reactor to maintain minimum output through the desired range in the region beyond cutoff.

The optimum value of the resistance 34 may be determined empirically very simply by using an adjustable resistance and plotting the control characteristic for different ohmic values of the resistance 34 until the desired characteristic is obtained. This is illustrated in Fig. 1 by the contral characteristic curves plotted for different relative values of the resistance 34. Curve A represents infinite resistance, with the curves B through E, in that order, representing relatively decreasing ohmic values for resistance 34. With the resistance at infinity the control characteristic will obviously have the rising slope or tail beyond cutoff. However, as the resistance value is reduced the slope beyond cutoff will be reduced until it is substantially flat for a considerable range beyond cutoff. Further reduction of resistance will increase the minimum output value of the amplifier but the slope beyond cutoff will still be substantially flat for an extended range as in curve E, Fig. 2.

It will be appreciated that the internal resistance of the winding and rectifier in the closed current path may be designed to such values that additional external impedance as indicated at 34 may not be necessary.

A workable value of the resistance may be determined with the following formula;

$$R=\frac{E}{I}\left(\frac{N_1}{N_2}\right)^2$$

where R is the total effective resistance in the closed current path including the winding and the rectifier and resistor shunted across the winding; E is the voltage across the reactance or output winding 24 of the reactor at minimum output (the supply voltage is a close approximation of E because at minimum output almost all of the supply voltage will appear across the output winding); I is the magnetizing current associated with the output winding and the voltage E (the load current at minimum output is often near the value of the magnetizing current); $N_1$ is the number of turns on the winding in the closed current path; $N_2$ is the number of turns on the output winding; and $$\left(\frac{N_1}{N_2}\right)^2$$

is the square of the turns ratio between the winding in the closed current path and the output winding. The value of resistance 34 closely approximates the total effective resistance R in the closed current path. The value R obtained by this formula may be departed from over a wide range to obtain the control characteristics desired in any particular case, for example such widely differing characteristics as typified in curves B and E of Fig. 1.

It may be noted that magnetizing current is the current that would flow in a reactor winding for a particular voltage value when all other windings on the reactor are open, and an alternating current of the particular voltage value is applied across the reactor winding.

The magnetizing current I for the output winding may be determined by disconnecting the entire reactor from the circuit and applying an A. C. voltage of the value E across the output winding. The resulting current flow will, neglecting losses, be the magnetizing current for the voltage E.

Figure 3:
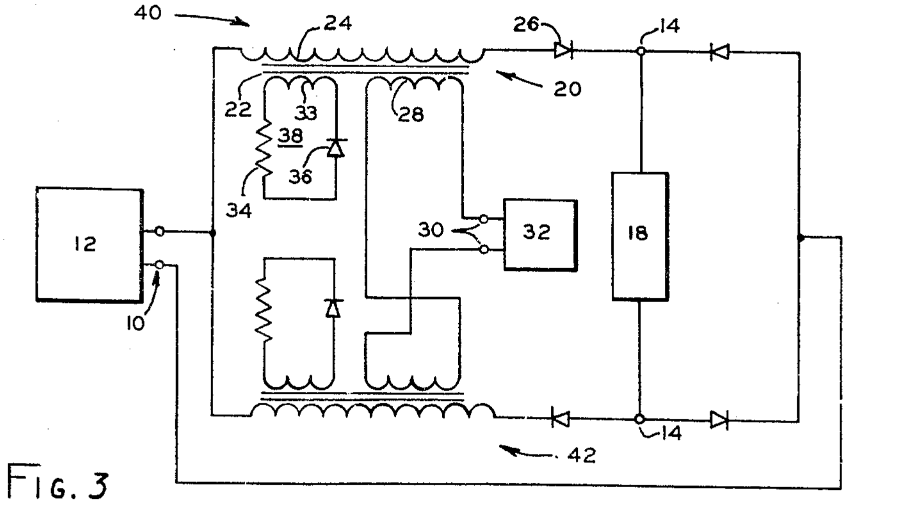
Fig. 3 is a diagram showing the application of the invention to another form of a magnetic amplifier.

Referring now to Fig. 3, the circuit therein illustrates the invention as applied to a bridge-type magnetic amplifier which has two adjacent arms 40 and 42 operable to transmit power to the load on alternate half cycles of the supply voltage. Each of the arms 40 and 42 is similar in structure and operation to the half-wave amplifier illustrated in Fig. 2. Similar components in Figs. 2 and 3 are indicated by the same reference numerals.

Use of the closed current path of the invention in the manner described herein also results, in many cases, in reducing the normal minimum output of an A. C. controlled, self-saturating magnetic amplifier, thus extending the range of control.

While the form of embodiment of the invention as herein disclosed constitutes a preferred form, it is to be understood that other forms might be adopted, all coming within the scope of the claims which follow.

What is claimed is as follows:

1. In a magnetic amplifier having power input and output circuits and a saturable reactor with a reactance winding connected in series with a half-wave rectifier between the input and output circuits for salf-saturation and having means for controlling the reactor with alternating current M. M. F.'s the combination therewith of a closed current path comprising a second winding on the reactor and a circuit including a second half-wave rectifier connected across the second winding, said windings being conductively isolated and the conducting directions of the respective rectifiers being such that currents passed thereby and allowed to flow in the respective windings will produce oppositely related M. M. F.'s in the reactor.

2. In an A. C. controlled magnetic amplifier having power input and output circuits and a saturable reactor with a reactance winding connected in series with a half-wave rectifier between the input and output circuits for self-saturation, the combination therewith of a closed current path comprising a second winding on the reactor, a second half-wave rectifier, and an impedance, the rectifier and the impedance being connected in series with each other and across the second winding, said rectifiers being poled to allow current flow through the respective windings in directions to produce oppositely related magnetic effects in the reactor.

3. In a magnetic amplifier having power input and output circuits and a saturable reactor with a reactance winding connected in series with a half-wave rectifier between the input and output circuits for self-saturation, and with means including a source of alternating current coupled to the reactor for supplying alternating control current to the reactor, the combination therewith of a closed current path comprising a second winding on the reactor, an impedance, and a second half-wave rectifier, said windings being conductively isolated from each other and the second rectifier being poled to allow induced current flow in the second winding in a direction to produce M. M. F.'s in the reactor oppositely related to M. M. F.'s produced by current passed through the reactance winding by the first rectifier.

4. In a magnetic amplifier having power input and output circuits a saturable reactor with a reactance winding connected in series with a half-wave rectifier between the input and output circuits for self-saturation, and means including a source of alternating control current connected to the reactor for supplying the reactor with alternating current to control the output of the reactor, the combination therewith of a closed current path comprising a second winding on the reactor, a resistance, and a second half-wave rectifier, the second rectifier being poled to allow induced current flow in the second winding in a direction to produce M. M. F.'s in the desaturating direction.

5. In a magnetic amplifier, a rector with a saturable core, self-saturating means including a winding on said core and a first half-wave rectifier connected in series with the winding, means including a source of alternating current coupled to the reactor for supplying alternating control current to the reactor, and means for reducing the slope of the control characteristic beyond cutoff when alternating current is supplied to the reactor to control the output thereof, said means comprising a second winding on the core, and a second half-wave rectifier connected across the second winding and poled to allow induced current to flow in the second winding to produce M. M. F.'s opposed to self-saturation.

6. A magnetic amplifier comprising a power input circuit for receiving alternating supply voltage, an output circuit for connection to a load, a self-saturating reactor circuit for controlling the transmission of power between the input circuit and the output circuit, said reactor circuit comprising a saturable core, a winding on the core, a half-wave rectifier in series with said winding between the input and output circuits for providing self-saturating M. M. F.'s, a second winding on the core, a second half-wave rectifier, impedance connected in series with the second rectifier, the impedance and second rectifier being connected across the second winding, the second rectifier being poled to allow induced current to flow through the second winding in a direction which will produce M. M. F.'s, oppositely related to the first said M. M. F.'s, and means for controlling the output of the reactor with alternating control current, said means including a source of alternating control current connected to a winding on the core to supply alternating current thereto.

7. In a magnetic amplifier having power input and output circuits and a saturable reactor with a reactance winding connected in series with a half-wave rectifier between the input and output circuits for self-saturation, the combination therewith of a second winding on the reactor, a second half-wave rectifier connected across the second winding and poled to allow induced currents to flow in the second winding in a direction to produce magnetic effects opposing self-saturation, a source of alternating control current, and a third winding on the reactor connected to receive alternating control current from said source to control the output of the reactor.

8. In a magnetic amplifier having power input and output circuits and a saturable reactor with a reactance winding connected in series with a half-wave rectifier between the input and output circuits for self-saturation, the combination therewith of a second winding on the reactor, a resistance, a second half-wave rectifier in series with the resistance, the second rectifier and resistance being connected across the second winding to form a closed current path with the second rectifier poled to allow currents induced in the second winding to flow in a direction to produce magnetic effects opposing self-saturation, a source of alternating control current, and a third winding on the reactor connected to receive alternating control current from said source to control the reactor output.

9. In a magnetic amplifier system having an alternating current power supply source, a load, a saturable reactor with a reactance winding coupled to the supply source and to the load, a half-wave rectifier in series with the reactance winding for subjecting the winding to unidirectional current to provide self-saturation, and means for controlling the output of the reactor with alternating M. M. F.'s, the combination therewith of a closed current path comprising a second winding on the reactor and a second rectifier connected across the second winding, the respective rectifiers being poled to allow current flow in the respective windings in directions that will produce oppositely related M. M. F.'s.

10. In a magnetic amplifier system having an alternating current power supply source, a load, a saturable reactor with a reactance winding coupled to the supply source and to the load, a half-wave rectifier in series with the reactance winding for subjecting the winding to unidirectional current to provide self-saturation, and means including a source of alternating control current connected to the reactor for controlling the output of the reactor with alternating current, the combination therewith of a closed current path comprising a second winding on the reactor and a second half-wave rectifier plus a series impedance connected across the second winding, the respective rectifiers being oppositely related to each other with respect to induced voltages in the reactor.

11. A magnetic amplifier system comprising an alternating current power supply source, a load, a reactor with a saturable core and a reactance winding carried by the core and coupled to the supply source and to the load, a half-wave rectifier in series with the reactance winding for subjecting the winding to unidirectional current to provide M. M. F.'s for self-saturation, a closed current path comprising a second winding on the reactor, a second half-wave rectifier and an impedance in series with each other, said windings being conductively isolated and the second rectifier being poled to allow current flow in the second winding in the direction that will produce M. M. F.'s oppositely related to the self-saturating M. M. F.'s, and means including a source of alternating current connected to a winding on the core to supply alternating control current to the reactor to control the output thereof.

References Cited in the file of this patent

UNITED STATES PATENTS

| | | |
|---|---|---|
| 1,788,152 | Dowling | Jan. 6, 1931 |
| 2,554,203 | Morgan | May 22, 1951 |
| 2,700,759 | Ogle | Jan. 25, 1955 |

FOREIGN PATENTS

| | | |
|---|---|---|
| 358,083 | Great Britain | Sept. 28, 1931 |